United States Patent
Garrett

[15] 3,655,082
[45] Apr. 11, 1972

[54] CAMPER CYCLE CARRIER
[72] Inventor: Dennis J. Garrett, 9417 Linden Avenue North, Seattle, Wash. 98103
[22] Filed: Nov. 10, 1969
[21] Appl. No.: 875,392

[52] U.S. Cl. ...........................................................214/450
[51] Int. Cl. .......................................................B60n 9/00
[58] Field of Search .................214/450, 38.10; 224/42.03 B, 224/42.08

[56] References Cited
UNITED STATES PATENTS

| 2,994,159 | 8/1961 | Bonidie | 214/38.10 X |
| 3,366,256 | 1/1968 | Meredith et al. | 214/450 |
| 3,458,073 | 7/1969 | Dawson | 214/450 |

Primary Examiner—Gerald M. Forlenza
Assistant Examiner—John Mannix
Attorney—Robert W. Beach

[57] ABSTRACT

A cycle-supporting base beam projects horizontally from the lower end of a dogleg supporting post pivoted on a mount attached to an automotive vehicle. The base beam is tilted sidewise away from the vehicle and wheel guards carried by the base beam and its supporting post are offset from the vehicle farther than the base beam to hold the wheels of a cycle so that the cycle leans away from the vehicle. The portion of the base beam remote from the supporting post is mounted to tilt downward from the post-attached portion of the base beam to provide a ramp for loading a cycle onto the carrier. The carrier can be swung away from the vehicle to facilitate loading and the base beam can be latched in position close alongside the rear of the vehicle during travel.

9 Claims, 11 Drawing Figures

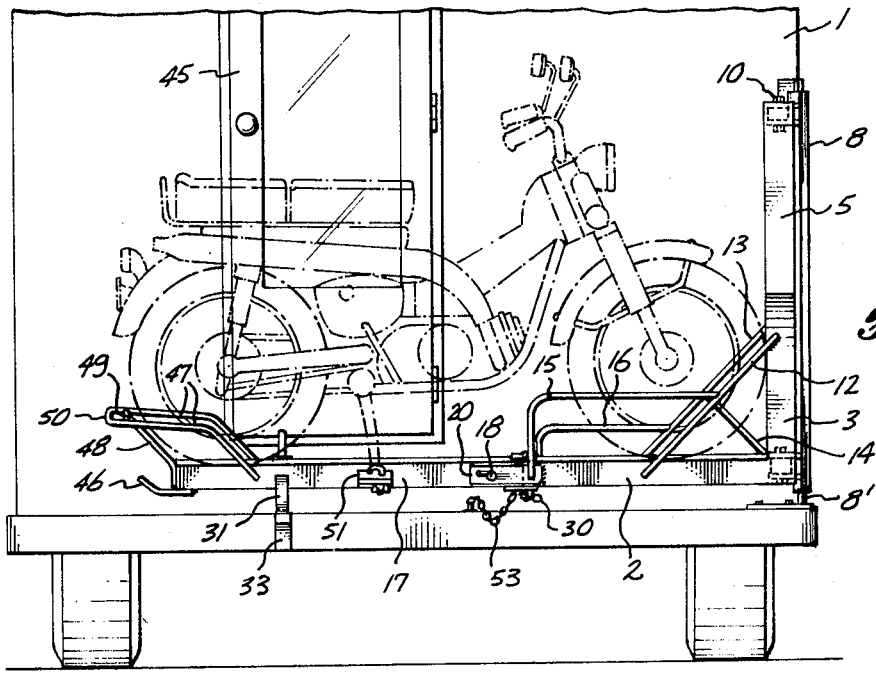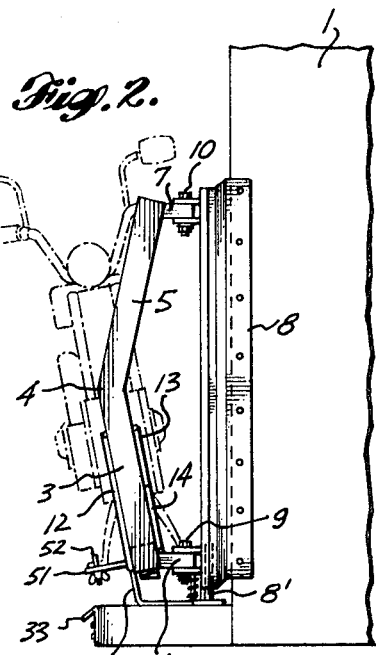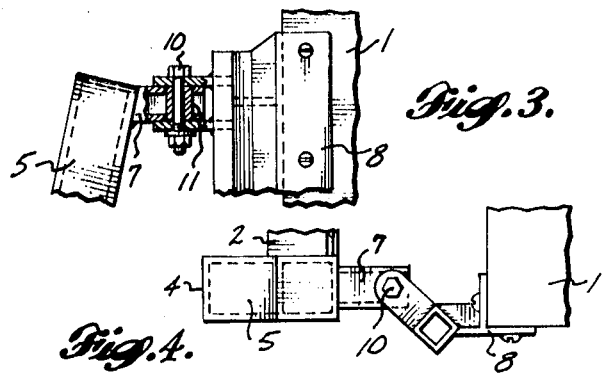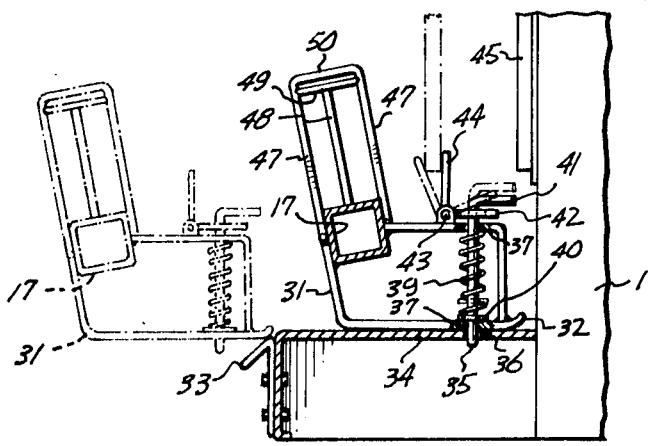

INVENTOR
DENNIS J. GARRETT
BY
Robert W. Beach
ATTORNEY

INVENTOR
DENNIS J. GARRETT
BY
Robert W. Beach
ATTORNEY

3,655,082

CAMPER CYCLE CARRIER

It is an object of the invention to provide a compact and strong cycle carrier which is economical to construct and can be installed readily on a camper or other automotive vehicle.

A particular object is to provide such a carrier which is safe to manipulate and which will be safe to use in transit.

Another object is to provide a cycle carrier which can be disposed alongside a vehicle during travel and which can be swung easily away from the vehicle from the inside of the vehicle if it is a camper, as well as from outside of the vehicle.

It is also an object to provide a cycle carrier onto which a cycle can be loaded and from which a cycle can be unloaded quickly and easily.

FIG. 1 is a side elevation of a cycle carrier mounted on the rear of a camper, and FIG. 2 is an end elevation of such carrier.

FIG. 3 is an enlarged fragmentary end elevation of the upper portion of the carrier having parts broken away and FIG. 4 is a plan of such portion viewed from line 4—4 of FIG. 3.

FIG. 5 is a vertical section through the carrier taken on line 5—5 of FIG. 1.

Figure 7:
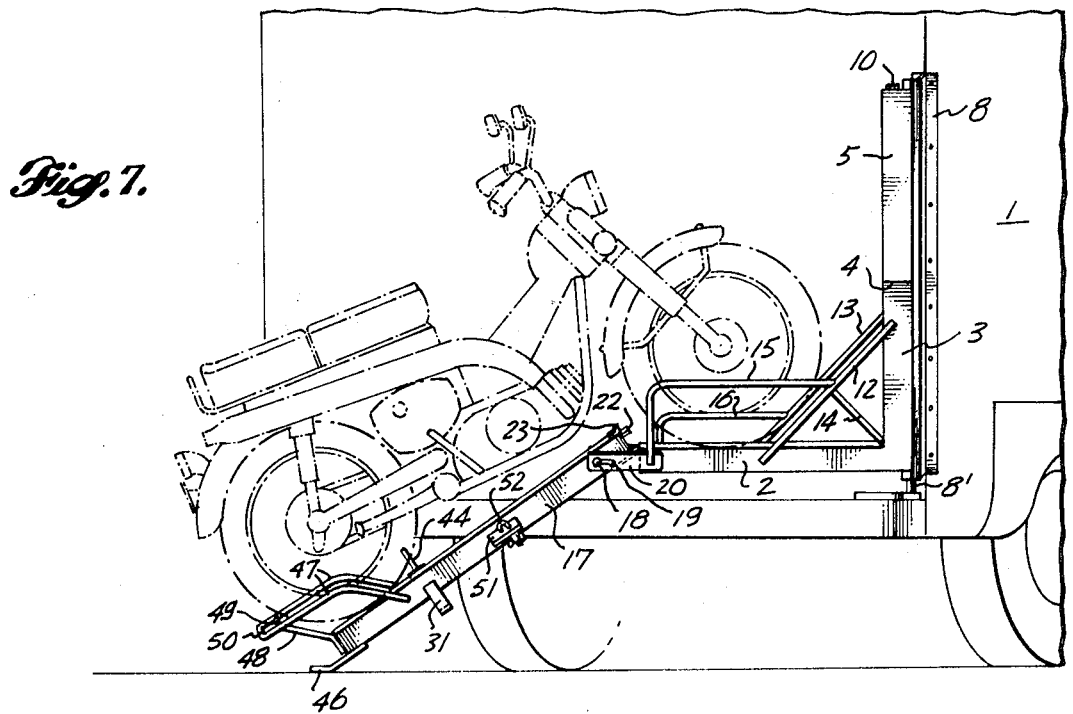
FIG. 7 is a side elevation of the carrier showing parts in positions different from those in which they are shown in FIG. 1.

Heretofore it has been proposed to carry cycles on automotive vehicles, such as campers or trucks, slung ahead of behind the automotive vehicle with the length of the cycle extending transversely of the automotive vehicle. It is undesirable to carry a cycle in this manner ahead of an automotive vehicle because the cycle attends to obstruct the headlights of the vehicle and, if the vehicle should run into an object, the cycle would be damaged because it projected ahead of the vehicle bumper. Also, if the cycle should become dislodged, the automotive vehicle would run over it, which would be likely to cause damage both to the cycle and to the automotive vehicle.

On the other hand, if the cycle is mounted behind a camper, it usually is not possible for the driver to check on the security of the cycle if its fastenings should begin to become loose and, consequently, the driver would not be aware of the cycle being in danger of falling from the vehicle until it had actually fallen and sometimes the driver even then was not aware of the mishap. Moreover, when the cycle is lashed to the rear of the vehicle, it obstructs the rear access door to the camper body and may obstruct tail lights of the camper.

Whether a cycle is slung ahead or behind an automotive vehicle, it has been difficult to load and to unload the cycle because even small cycles are quite heavy and unwieldy, particularly for one person to handle. Also, the weight of such a cycle has placed on parts of the vehicle loads which they were not intended to carry, which has resulted in failure of such parts and perhaps in the cycle falling from the vehicle. It has therefore been difficult to carry cycles easily and safely on automotive vehicles.

The cycle carrier of the present invention eliminates virtually all of the disadvantages of previous arrangements for carrying cycles on automotive vehicles. The carrier is particularly advantageous for use in carrying a cycle alongside the rear of a camper with the length of the cycle extending transversely of the camper. The carrier could, however, be installed on the front or on the side of an automotive vehicle, in some instances with minor modifications. The invention is described below as being installed on the rear of an automotive camper 1 in a position such that the length of a cycle will extend transversely of the vehicle.

The weight of the cycle is transmitted to the carrier through its wheels and tires in the normal fashion by the wheels resting on the base beam 2 of the carrier. This base beam projects from the lower portion of a dogleg post and one end of such base beam is integral with the portion 3 of the post below its bend 4. Such bend is located at the central portion of the post so that the lower post portion 3 and the upper post portion 5 are of approximately equal length.

As shown best in FIG. 2, when the carrier is oriented so that the base beam 2 is located parallel to and close alongside the rear of the camper, the lower portion 3 of the post is inclined upwardly and outwardly from the vehicle, whereas the upper portion 5 of the post is inclined upwardly and inwardly toward the vehicle. Also, the angles of inclination of the two post portions 3 and 5 relative to vertical are shown as being equal so that, since the lengths of such portions are equal, the spacing between the upper and lower post ends and the vehicle is the same. Such post is mounted on the vehicle by a lower lug 6 and an upper lug 7 projecting from the side of the post next to the vehicle as shown in FIGS. 2, 3, 4, 10 and 11.

The carrier is attached to one corner of the camper body 1 by a mounting iron 8 of angle or tee cross-section embracing the corner of the vehicle body as shown in FIG. 4. The flanges of such mounting are fastened to the vehicle body by screws or bolts and a pin 8' secured to the vehicle is received in a socket in the lower end of the mounting. The lugs 6 and 7 are secured to the mounting 8 by connecting clevises embracing the post lugs. The lower clevis includes a pivot bolt 9 secured to the lower post lug 6 and the upper clevis includes a pivot bolt 10 secured to the upper post lug 7 guiding the base beam for lateral swinging of its opposite end portion about the upright axis of pivots 9 and 10 away from the camper. Preferably the lugs 6 and 7 are hollow and pivot bearing tubes 11 extending through them receive the respective pivot bolts.

Figure 10:
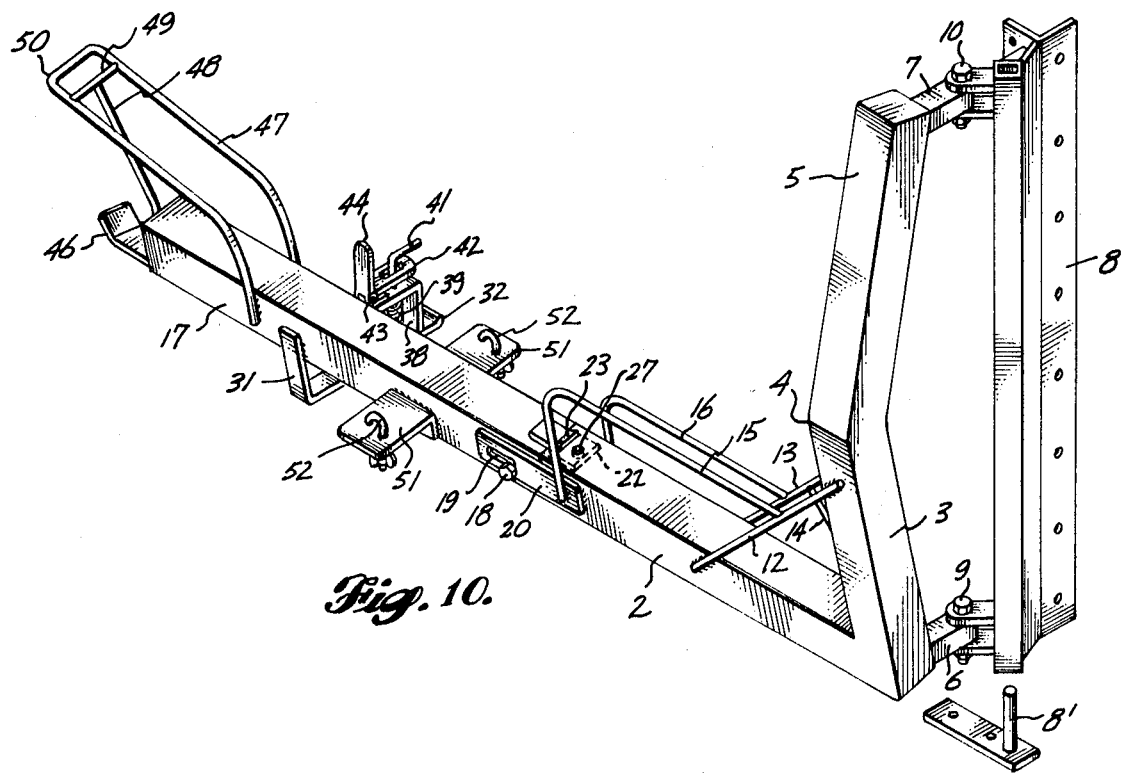
FIG. 10 is a top perspective of the carrier and FIG. 11 also is a top perspective of the carrier with portions of the carrier in positions different from the positions of those portions shown in FIG. 10.

The base beam 2 and the post 3,5 are square tubes of the same cross-sectional size. The upper side of the base beam is shown in FIGS. 2 and 10 as being tilted sidewise and its flat parallel opposite upright sides are coplanar with the corresponding upright sides of the lower post portion 3. The base beam upper side and the lower post portion are secured perpendicular to each other by welding the joint between the members when they are thus disposed.

Diagonal brace rod 12 shown in FIGS. 1, 2 and 10 is welded to the sides of the carrier members farther from the vehicle and diagonal brace rod 13 is welded to the sides of such members closer to the vehicle. A stub brace rod 14 extends between the central portion of brace 13 and the junction of the base beam 2 and the lower post portion 3. A bent guard rod 15 extends above the base beam between brace rod 12 and one base beam side and another bent guard rod 16 extends between brace rod 13 and the opposite side of the base beam. Such spaced guard rods are thus located coplanar with the sidewise tilted opposite sides of the base beam which will locate them offset to one side from vertical symmetry with the base beam so that the cycle will lean from the vertical away from the camper.

As has been discussed, a portion of the base beam 2 is rigidly connected to the lower portion 3 of the carrier post in cantilever fashion by a direct welded corner joint and by brace rods welded in place. It is preferred that a portion of the base beam farther from post 3,5 than the guards 15 and 16 be swingable relative to the adjacent portion of the base beam rigidly attached to the post to form the ramp section 17. Such ramp section is guided to swing downward relative to the adjacent base beam section between the relationship of these parts shown in FIG. 1 and that shown in FIG. 7 by a pivot bolt 18 of a bayonet mount.

Such pivot bolt extends through angle slots 19 in plates 20 located along opposite sides of an end of the ramp section 17 and welded to the opposite sides of the adjacent end portion of the fixed base beam section. The adjacent ends of the ramp section and the fixed base beam section are then formed as a slip joint including plates 21 and 22 projecting from the lower and upper sides of the ramp section end in positions to engage beneath the lower and upper sides of the adjacent end of the fixed base beam section. Relative swinging of the two base beam parts can be restricted when the slip joint sections are engaged by providing an upper lug 23 on the upper side of the ramp section end to engage the upper side of the fixed beam section end.

Figure 8:
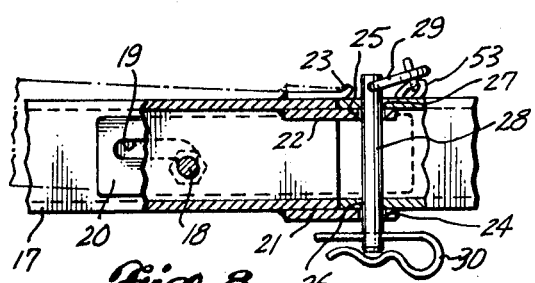
FIG. 8 is an enlarged detail side elevation of a portion of the carrier with parts broken away and FIG. 9 is a similar view showing a portion of the carrier in a position different from that shown in FIG. 8.
Figure 9:
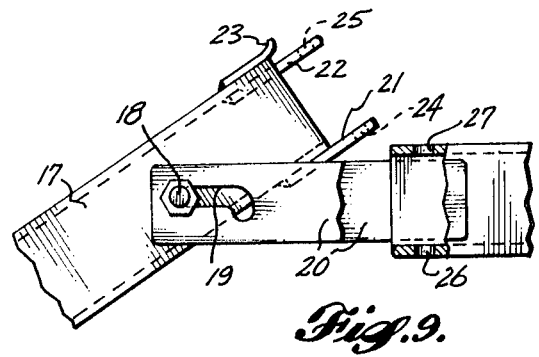

The tongues 21 and 22 of the slip joint between the base beam sections have in them apertures 24 and 25, respectively, which register with apertures 26 and 27 in the bottom and top of the fixed base beam section end when the slip joint is in its engages position. A lock bolt 28 can be inserted through the holes 24, 25, 26 and 27 to lock the parts of the slip joint in their engaged relationship shown in FIG. 8. Downward movement of the lock bolt through the holes is arrested by a lifting ring 29 extending through an aperture in the upper end of the lock bolt. Inadvertent removal of the lock bolt is prevented by a keeper 30 which can be extended through an aperture in the lower end of the lock bolt as shown in FIG. 8.

A foot 31 is provided on the ramp section of the base beam at a location spaced from the pivot 18, the end of which foot adjacent to the vehicle body has a skid nose 32 engageable with a ramp lug 33 secured to the outer face of the camper step 34. Such ramp lug will wedge the carrier foot 31 upward from the position shown in broken lines in FIG. 5 to the position shown in solid lines in that figure as the carrier is swung about pivot bolts 9 and 10 toward the camper body.

When the foot has been shifted toward the body to the solid-line position shown in FIG. 5, a latch bolt carried by the carrier foot can be inserted into a socket aperture 36 in the camper step 34 to retain the carrier against inadvertent swinging above its pivots 9 and 10 away from the camper body. Such bolt is guided for longitudinal movement toward and away from the socket 36 by passing through vertically spaced holes 37 in the carrier foot. The upper hole 37 is in a brace bar 38 forming the upper portion of the foot.

The latch bolt 35 normally is urged downward so that its lower end will engage in the socket 36 by a compression spring 39 encircling the latch bolt between the upper and lower bars of the carrier foot. The upper end of such spring bears against the upper bar and the lower end of such spring bears against a collar 40 secured to the latch bolt adjacent to its lower end. The latch bolt can be raised in opposition to the downward force exerted by spring 39 by the operator grasping the bent upper end 41 of the latch bolt, constituting a handle.

Alternatively, the latch bolt 35 can be raised into released position by engagement of the horizontal arm 42 of a bell crank with the bent end 41 of the latch bolt. Such bell crank can be swung about its pivot 43 by deflection of its upwardly projecting arm 44 in a direction away form the camper body 1. Such upwardly projecting bell crank arm is located in the path of the swinging edge of camper door 45 as is evident from FIG. 5. As the camper door is swung open from the solid-line position to the broken-line position of that figure, its lower portion will engage the upwardly projecting bell crank arm and swing it into the broken-line position so as to raise the horizontal arm of the bell crank for lifting the latch bolt 35 into its broken-line unlatched position. The swinging end of the carrier can then be swung from the solid-line position of FIG. 5 to the left into the broken-line position.

When the base beam of the carrier is broken about its slip joint to swing the ramp section 17 downward from its position shown in FIG. 1 to that of FIG. 7, the lower end of such ramp section will be supported from the ground by shoe 46 projecting from the lower side of the swinging end of such ramp section. On such swinging end of the ramp section is also mounted a wheel guard rod 47 of generally U-shape. The ends of such rod project downwardly along opposite sides of the ramp section and are welded to it.

The loop portion of the guard is supported by a brace rod 48 inclined upwardly and away from the lower end of the ramp section. The lower end of such brace rod is welded to the end of the ramp section as shown best in FIG. 11 and the upper end of such rod is welded to a cross rod 49 spanning across the bend of the guard. The bent portion 50 of the guard forms a handle which can be grasped to slide the ramp section 17 of the base beam toward or away from the fixed portion of the base beam and to raise or lower the swinging end of the ramp section.

Ears 51 project oppositely from opposite sides of the base beam generally centrally of its length and have tie-down hook bolts extending through them. The hooks of these bolts can engage the feet of legs projecting downward from a conventional motorcycle to tie the motorcycle positively to the carrier. Also, a safety chain 53 connects the camper with a suitable portion of the carrier, such as the ring 29 of the slip joint lock bolt 28, to limit outward swinging of the carrier away from the camper.

With the ramp section of the base beam lowered to the position of FIG. 7, the front wheel of a motorcycle can be set on the ramp section, the cycle pushed up the ramp and its rear wheel lifted over the wheel guard 47 and lowered within it to place the motorcycle in the position shown in broken lines in FIG. 7. Engagement of the rear wheel within the rear wheel guard will prevent the motorcycle from tipping over. Then by lifting the handle 50 and pushing it toward the post 3,5, the ramp section can be moved into the raised position shown in FIG. 10 and the slip joint engaged.

The slip joint can be held in such latched position by insertion of the lock bolt 28 through the apertures 27, 25, 26 and 24 as shown in FIG. 8. By inserting the keeper 30 in its hole, the base beam will then be secured in such raised position. At the same time the cycle will have been moved forward to the broken-line position of FIG. 1 so that its front wheel is lodged between the front wheel guards 15 and 16 and the braces 13 and 14 on one side and 12 on the other side.

As shown best in FIG. 2, because of the attitude of the guards 15, 16 and 47 and the braces 12, 13 and 14, resulting from the inclination of the lower post portion 3, the cycle will lean from upright position away from the vehicle. The cycle can be secured in such position by engaging the hook bolts 52 with the feet of the cycle legs and tightening such hook bolts.

Figure 6:
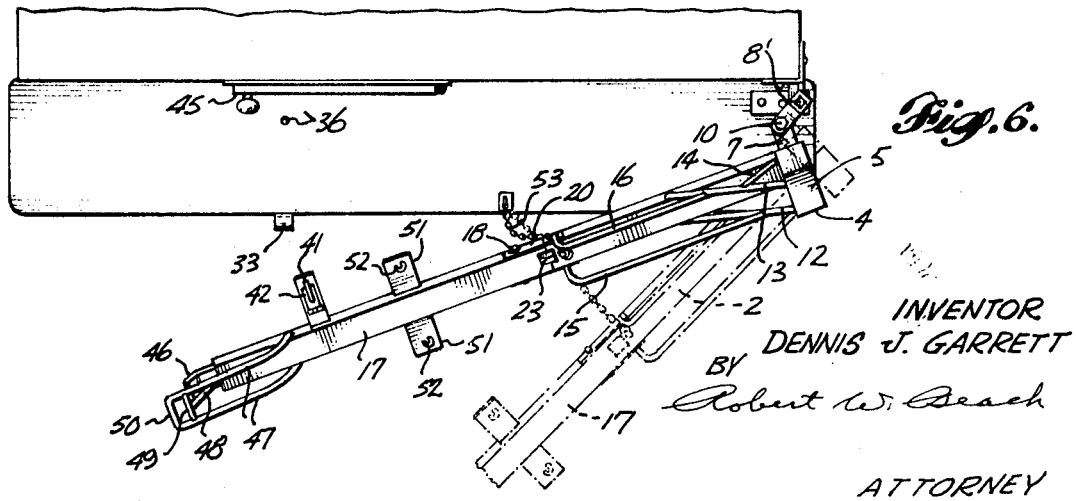
FIG. 6 is a plan of the carrier.

The carrier with the cycle loaded on it can then be swung from the broken-line position shown in FIG. 6 through the solid-line position of that figure and the broken-line position of FIG. 5 into the solid-line position of FIGS. 1, 2 and 5. The latch bolt 35 will automatically be engaged with the socket 36 in the camper step 34 by the spring 39 to hold the carrier securely in a position with the length of the cycle extending transversely of the camper. It will be seen from FIG. 2 that even with the base beam thus disposed close to the camper body, there will be adequate room for the cycle handle bars because of the leaning attitude of the cycle.

Figure 11:
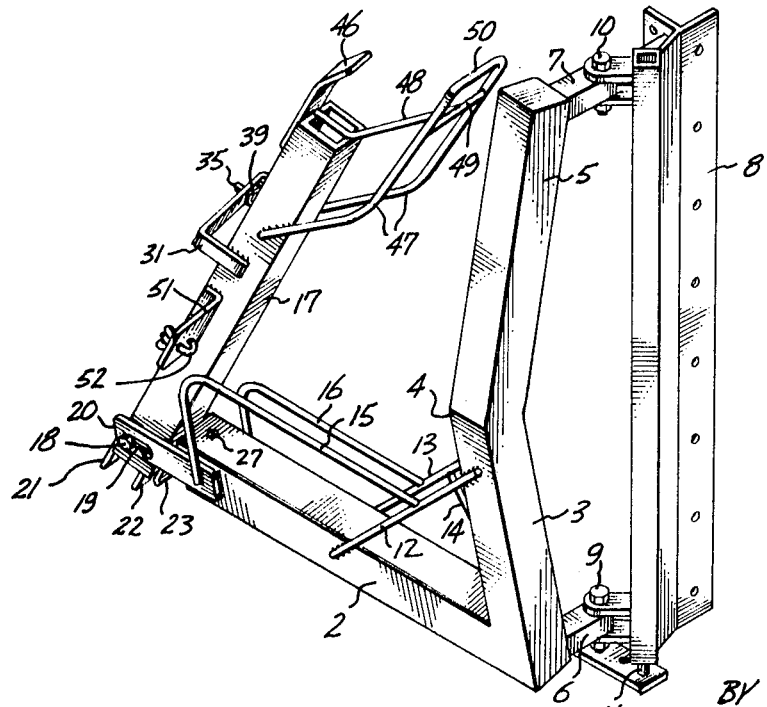

If it is desired to make the carrier more compact when a cycle is not being carried, the ramp section 17 of the base beam can be swung from its horizontal position upward to the position of FIG. 11 generally overlying the portion of the base beam attached to the supporting post 3,5.

I claim:

1. A cycle carrier for an automotive vehicle, comprising a base beam engageable by the wheels of a cycle for supporting the cycle, supporting means engaged with one end portion of said base beam and supporting the same in cantilever fashion, and pivot means supporting said supporting means, carried by the vehicle and guiding said supporting means and said base beam for swinging said base beam toward and away from the vehicle, said supporting means including a dogleg post having a lower portion inclined upwardly and outwardly away from the vehicle and an upper portion inclined from said lower portion upwardly toward the vehicle when said base beam is disposed alongside the vehicle, the upper side of said base beam being disposed substantially perpendicular to said lower portion of said dogleg post so that said base beam upper side is tilted sideways away from the vehicle.

2. The cycle carrier defined in claim 1, in which the base beam has substantially flat parallel opposite upright side disposed, respectively, substantially coplanar with the opposite sides of the lower portion of the post, and diagonal braces spaced transversely of the base beam and extending between and secured to opposite sides of the base beam and opposite sides of the post, respectively.

3. A cycle carrier for an automotive camper, comprising a base beam engageable by the wheels of a cycle for supporting the cycle, supporting means attached to the rear portion of the camper for supporting said beam behind the camper for swinging between a position with its length extending transversely of the camper and a position swung away form the rear of the camper, latch means engageable between said base beam and the camper when said base beam is swung into a position with its length extending transversely of the camper for preventing swinging of said base beam away from the camper, means engageable with said latch means by swinging of said base beam toward the camper to move said latch means into latching condition, the camper having a rear door, and means operable by opening movement of the camper door to release said latch means for enabling said base beam to be swung away from the camper.

4. A cycle carrier for an automotive camper having a rear door and a rear step beneath the door, comprising a base beam for supporting the cycle, attaching means for the carrier attached to the rear portion of the camper at one side for supporting said base beam behind the camper with its length extending transversely of the camper, a dogleg post supporting said base beam from its lower portion in cantilever fashion, said post including said lower portion inclined upwardly and outwardly away from the camper and an upper portion inclined from said lower portion upwardly toward the camper when said base beam is disposed close alongside the rear of the camper, the upper side of said base beam being disposed substantially perpendicular to said lower portion of said dogleg post so that said base beam upper side is tilted sidewise away from the camper, said base beam having substantially flat opposite upright sides tilted sidewise and disposed respectively substantially coplanar with the opposite sides of said lower portion of said dogleg post, diagonal braces spaced transversely of said base beam and extending between and secured to opposite sides of said base beam and opposite sides of said post, respectively, wheel guard rods spaced apart transversely of the length of said base beam, secured to opposite sides of said base beam and extending upwardly above the upper side of said base beam substantially coplanar with said opposite sides of said base beam, respectively, pivot means connecting the upper and lower end portions of said dogleg post to said attaching means for swinging of an end portion of said base beam laterally between a position close alongside the rear of the camper and a position swung away from the camper, pivot means connecting said laterally swinging end portion of said base beam to an adjacent portion of said base beam for downward swinging of said laterally swinging end portion of said base beam relative to said adjacent portion of said base beam to form a ramp along which the cycle can be wheeled in loading it onto said base beam, slip joint means carried by the adjacent ends of said downwardly swingable base beam portion and said adjacent base beam portion, said slip joint means being engageable to support said downwardly swingable base beam portion from said adjacent base beam portion in substantially aligned relationship, latch means engageable between said base beam and the camper step for preventing swinging of the laterally swinging end portion of said base beam away from the camper, and latch-releasing means operable to release said latch means for enabling the laterally swinging end portion of said base beam to be swung away from the camper.

5. The cycle carrier defined in claim 4, in which the latch-releasing means includes a member located in the path of swing of the camper door for engagement by the camper door in being opened to release the latch means.

6. A cycle carrier for an automotive vehicle, comprising a base beam engageable by the wheels of a cycle for supporting the cycle, said base beam including two end sections relatively movable lengthwise between a contracted relationship in which the adjacent ends of the end sections are interengaged to hold such end sections in alignment and an extended relationship in which said end sections are disposed with their lengths at an angle to each other, supporting means engaged with one end section of said base beam and supporting the same in cantilever fashion, and pivot means supporting said supporting means and guiding said supporting means and said base beam for swinging said base beam toward and away from the vehicle when the end sections of said base beam are in contracted aligned relationship.

7. The cycle carrier defined in claim 6, and latch means interengaged between the two ends sections of the base beam when they are in contracted relationship for holding them in such contracted aligned relationship.

8. A cycle carrier for an automotive vehicle, comprising a base beam engageable by the wheels of a cycle for supporting the cycle and including two end sections, supporting means supporting a first one of said base beam end sections for swinging laterally between a position alongside the vehicle and a position swung away from the vehicle, means supporting the other end section of said base beam for swinging downward relative to the first end section of said base beam to form a ramp along which the cycle can be wheeled in loading it onto said base beam, and slip joint means for interconnecting the adjacent ends of said base beam end sections to support said other base beam end section and said first base beam end section in substantially aligned relationship.

9. A cycle carrier for an automotive vehicle, comprising a base beam engageable by the wheels of a cycle for supporting the cycle, supporting means engaged with one end portion of said base beam and supporting the same in cantilever fashion, pivot means supporting said supporting means, carried by the vehicle and guiding said supporting means and said base beam for swinging said base beam toward and away from the vehicle in a substantially horizontal plane about a substantially vertical axis, and cycle-retaining means for holding the cycle on said base beam in a position leaning sideways relative to said pivot means in all such swung positions of said base beam, said supporting means including a dogleg post having a lower portion inclined upwardly and outwardly away from the vehicle and an upper portion inclined from said lower portion upwardly toward the vehicle when said base beam is disposed substantially parallel to an adjacent side of the vehicle, said cycle-retaining means holding the cycle leaning sideways so that the plane of the cycle wheels and the lower inclined portion of said dogleg post are substantially in registration, said base beam being essentially articulated whereby the portion of said base beam remote from said supporting means may swing downward to ground level relative to said one end portion of said base beam.

* * * * *